(12) United States Patent
Dankberg et al.

(10) Patent No.: US 7,929,909 B2
(45) Date of Patent: Apr. 19, 2011

(54) UPSTREAM BROAD BEAM DIVERSITY WITH INTERFERENCE CANCELLATION

(75) Inventors: Mark D. Dankberg, Encinitas, CA (US); Charles N. Pateros, Carlsbad, CA (US)

(73) Assignee: ViaSat, Inc., Carlsbad, CA (US)

( * ) Notice: Subject to any disclaimer, the term of this patent is extended or adjusted under 35 U.S.C. 154(b) by 829 days.

(21) Appl. No.: 11/843,429

(22) Filed: Aug. 22, 2007

(65) Prior Publication Data

US 2008/0214107 A1    Sep. 4, 2008

Related U.S. Application Data

(60) Provisional application No. 60/823,126, filed on Aug. 22, 2006, provisional application No. 60/823,127, filed on Aug. 22, 2006, provisional application No. 60/823,128, filed on Aug. 22, 2006, provisional application No. 60/823,131, filed on Aug. 22, 2006.

(51) Int. Cl.
  *H04B 7/185* (2006.01)
  *H04B 7/19* (2006.01)
  *H04W 4/00* (2009.01)
  *H04W 40/00* (2009.01)

(52) U.S. Cl. ............... 455/13.4; 455/12.1; 455/13.1; 455/427

(58) Field of Classification Search ............ 455/12.1, 455/13.1, 427, 428, 429, 431, 13.4
See application file for complete search history.

(56) References Cited

U.S. PATENT DOCUMENTS

| | | | |
|---|---|---|---|
| 5,446,756 A | 8/1995 | Mallinckrodt | |
| 5,828,947 A * | 10/1998 | Michel et al. | 455/13.4 |
| 5,832,379 A | 11/1998 | Mallinckrodt | |
| 5,940,753 A | 8/1999 | Mallinckrodt | |
| 5,949,766 A * | 9/1999 | Ibanez-Meier et al. | 370/316 |
| 5,995,832 A | 11/1999 | Mallinckrodt | |
| 6,515,980 B1 | 2/2003 | Bottomley | |
| 6,683,924 B1 | 1/2004 | Ottosson et al. | |
| 6,859,652 B2 | 2/2005 | Karabinis et al. | |
| 6,956,814 B1 | 10/2005 | Campanella | |
| 7,206,364 B2 | 4/2007 | Miller | |
| 7,269,235 B2 | 9/2007 | Miller | |
| 2002/0027957 A1 | 3/2002 | Paulrej et al. | |
| 2002/0050008 A1* | 5/2002 | Sloderbeck | 5/639 |

(Continued)

OTHER PUBLICATIONS

Notice of Allowance for U.S. Appl. No. 11/843,096 mailed on Dec. 9, 2010; 12 pages.

*Primary Examiner* — Tilahun Gesesse
(74) *Attorney, Agent, or Firm* — Kilpatrick Townsend & Stockton LLP

(57) ABSTRACT

A satellite communication system is provided according to one embodiment of the invention. The satellite communication system includes a gateway with first and second antennas. The first antenna receives a signal from a first satellite that includes at least a first signal from a first user. The second antenna receives a second signal from a second satellite, that includes at least a second primary signal from a second user and a version of the first signal. The gateway may include circuitry to isolate the first signal from the second signal. The gateway may also include a combiner configured to combine the first signal from the first satellite and the first signal isolated from the second signal. Various other embodiments are disclosed that isolate a secondary signal received from a satellite and combine the secondary signal with the same signal received from other antennas at the gateway.

14 Claims, 6 Drawing Sheets

U.S. PATENT DOCUMENTS

| | | |
|---|---|---|
| 2002/0061730 A1 | 5/2002 | Hart et al. |
| 2002/0132579 A1 | 9/2002 | Hart et al. |
| 2002/0136191 A1 | 9/2002 | Draim et al. |
| 2003/0050008 A1 | 3/2003 | Patterson et al. |
| 2004/0095907 A1 | 5/2004 | Agee et al. |
| 2005/0227618 A1 | 10/2005 | Karabinis et al. |
| 2006/0126750 A1 | 6/2006 | Friedman |
| 2008/0143589 A1 | 6/2008 | Dankberg et al. |
| 2008/0144596 A1 | 6/2008 | Dankberg et al. |
| 2008/0144734 A1 | 6/2008 | Dankberg et al. |
| 2008/0304555 A1 | 12/2008 | Larsson |
| 2010/0061293 A1 | 3/2010 | Schiff |

* cited by examiner

UPSTREAM BROAD BEAM DIVERSITY WITH INTERFERENCE CANCELLATION

CROSS-REFERENCES TO RELATED APPLICATIONS

This application is a non-provisional, and claims the benefit, of commonly assigned U.S. Provisional Application No. 60/823,126, filed Aug. 22, 2006, entitled "Feeder Link Polarization Diversity," the entirety of which is herein incorporated by reference for all purposes.

This application is a non-provisional, and claims the benefit, of commonly assigned U.S. Provisional Application No. 60/823,127, filed Aug. 22, 2006, entitled "Downstream Broad Beam Diversity," the entirety of which is herein incorporated by reference for all purposes.

This application is a non-provisional, and claims the benefit, of commonly assigned U.S. Provisional Application No. 60/823,128, filed Aug. 22, 2006, entitled "Downstream Broad Beam Diversity With Interference Cancellation," the entirety of which is herein incorporated by reference for all purposes.

This application is a non-provisional, and claims the benefit, of commonly assigned U.S. Provisional Application No. 60/823,131, filed Aug. 22, 2006, entitled "Upstream Broad Beam Diversity," the entirety of which is herein incorporated by reference for all purposes.

This application is related to commonly assigned U.S. patent application Ser. No. 11/843,474, filed Aug. 22, 2007, entitled "Cooperative Orthogonal Multi-Satellite Communication System," the entirety of which is herein incorporated by reference for all purposes.

This application is related to commonly assigned U.S. patent application Ser. No. 11/843,089, filed Aug. 22, 2007, entitled "Downstream Broad Beam Diversity," the entirety of which is herein incorporated by reference for all purposes.

This application is related to commonly assigned U.S. patent application Ser. No. 11/843,096, filed Aug. 22, 2007, entitled "Downstream Broad Beam Diversity With Interference Cancellation," the entirety of which is herein incorporated by reference for all purposes.

BACKGROUND OF THE INVENTION

This disclosure relates in general to satellite communication systems and, but not by way of limitation, to satellite communication systems using multiple satellites.

Satellites are power limited. That is, satellites have a limited power resources that can be used for communications, propulsion, processing, steering etc. Increasing the power available to these resources can be very expensive. Thus, satellite systems are often designed with tight power budgets. Therefore, increasing power to a communication link can be very expensive. On the other hand, the performance of a communication link can be proportional to the power associated with the communication link. Thus, a balance is often struck between performance gains and cost when considering designing a satellite communication system.

Gateway antennas are often larger than subscriber terminal antennas. Accordingly, the return link between the satellite and gateway can be lower powered than the link between the satellite and a subscriber terminal. Moreover, performance gains may be important between the gateway and the satellite because of these often lower powered signals.

There is a general need in the art to provide increased satellite signal strength without greatly increasing the costs of the overall satellite system.

BRIEF SUMMARY OF THE INVENTION

A satellite communication gateway is provided according to one embodiment of the invention. The gateway may include a first and second antenna. The first antenna may be configured to receive a signal from a first satellite that includes at least a first signal from a first user. The second antenna may be configured to receive a second signal from a second satellite that includes at least a second primary signal from a second user and a second secondary signal. The second secondary signal may include a version of the first signal from the first user. The gateway may also include a demodulator-remodulator configured to isolate the second primary signal from the second signal and an adder configured to subtract the second primary signal from the second signal leaving the second secondary signal. The gateway may also include a combiner configured to combine the first signal received at the first antenna and the second secondary signal received at the second antenna. According to one embodiment of the invention, the first user and/or the gateway does not lease access to the second satellite.

The satellite communication gateway may also include a third antenna configured to receive a signal from a third satellite. This third signal include at least a third primary signal from a third user and a third secondary signal. The third secondary signal may include a version of the first signal from the first user. The gateway may also include a demodulator-remodulator configured to isolate the third primary signal from the third signal and an adder configured to subtract the third primary signal from the third signal leaving the third secondary signal. The gateway may also include a combiner configured to combine the first signal received at the first antenna and the third secondary signal received at the third antenna. According to one embodiment of the invention, the first user and/or the gateway does not lease access to the third satellite.

In one embodiment, the gateway may include one or more combiners and/or remodulators/demodulators. In another embodiment the combiner may be a maximal ratio combiner.

A satellite communication method is also provided according to one embodiment of the invention. The method includes receiving a first signal from a first satellite The signal from the first satellite may include at least a first signal from a first user. The method also includes receiving a second signal from a second satellite. The signal from the second satellite may include at least a second primary signal from a second user and a second secondary signal. The second secondary signal may include a version of the first signal. The second primary signal may be canceled from the second signal. The resulting second signal may then be combined with the first signal. The method may also include delaying either the first or the second signal prior to the combining. The combining may include maximal ratio combining. The canceling may include demodulating the second signal using noise canceling techniques and/or forward error correction (FEC) decoding and/or encoding. The first user may leases access to the first satellite but does not lease access to the second satellite.

The satellite communication method may also include receiving a third signal from a third satellite according to another embodiment of the invention. The third signal from the third satellite includes at least a third primary signal from a third user and a third secondary signal. The third secondary signal may include a version of the first signal. The third primary signal may be canceled from the third signal using interference canceling techniques. The resulting third signal may then be combined with the first signal. The first user may not lease access to the third satellite.

Another satellite communication method is provided according to one embodiment of the invention. The method includes receiving a first and third signal from first and third satellites. The first signal includes at least a first primary signal from a first user and a second signal from a second user. The third signal includes at least a third primary signal from a third user and the second signal. These signals may be received at a gateway. The method also includes isolating the second signal from a version of the first signal and isolating the second signal from the third signal. The second signal isolated from the first signal and the second signal isolated from the third signal may then be combined. According to another embodiment of the invention the second user and/or the gateway does not lease access to the first or third satellites.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It being understood that various changes may be made in the function and arrangement of elements without departing from the spirit and scope as set forth in the appended claims.

Figure 1:
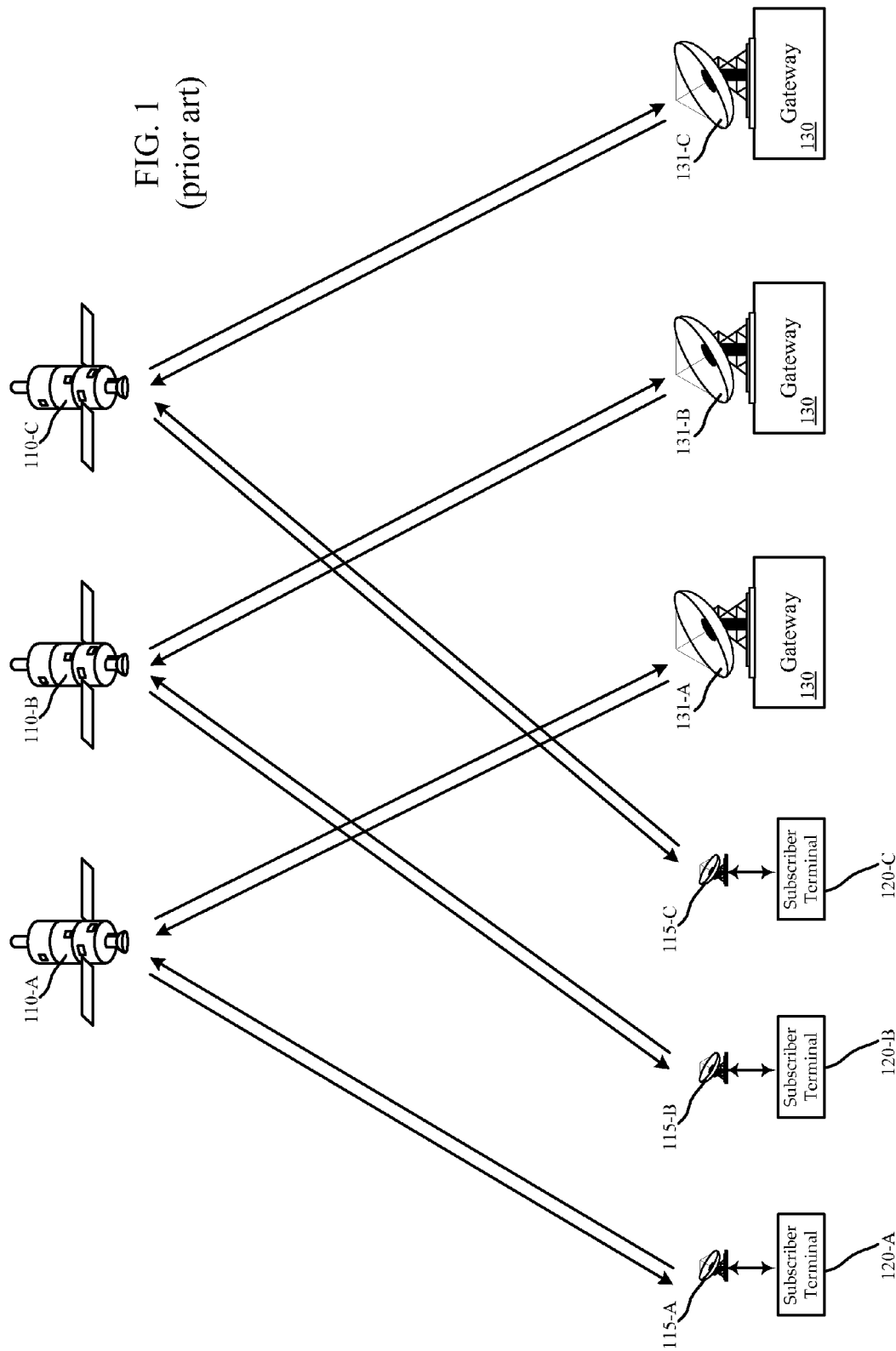
FIG. 1 depicts a common satellite communication system showing multiple subscriber terminals, each of which communicates with a gateway through an independent satellite.

Embodiments of the present disclosure provide for a satellite communication system that utilizes unleased satellites for communication between, for example, subscriber terminals and a gateway. FIG. 1 depicts a common satellite communication system showing multiple subscriber terminals 120, each of which communicate with a gateway 130 through a satellite 110. As shown, a first subscriber terminal 120-A communicates with a first gateway 130-A through a first link established through a first satellite 110-A. Also shown is a second subscriber terminal 120-B that communicates with a second gateway 130-B through second a link established through a second satellite 110-B. A third subscriber terminal 120-C communicates with a third gateway 130-C through a third link established through a third satellite 110-C. Thus, each of the three subscriber terminals 120 independently communicates with the gateway 130 through a link established by one of the three satellites 110. In practical systems, there are often multiple terminals communicating with each gateway, while only one terminal per gateway is shown in the figure for clarity.

Each of the antennas 115 at the three subscriber terminals 120 and/or each of the antennas 131 of the gateways 130 are pointed toward a primary satellite. For instance the antenna 115-A at the first subscriber terminal 120-A is pointed at the first satellite 110-A, and so on. Moreover, the operators of the gateways 130 and/or the subscriber terminals 120 may lease or purchase communication access through the corresponding satellite 110. This primary access may provide the operators the necessary coding and/or encryption schemes in order to communicate through the satellite link. Moreover, the three satellites may be within the same orbital slot, in adjacent orbital slots, or in neighboring orbital slots.

Signals received at the gateway antenna 131-B from the first satellite 110-A and the third satellite 110-C may be considered interference by the second gateway antenna 131-B. Similarly, signals received at the first gateway antenna 131-A from the second satellite 110-B and the third satellite 110-C may be considered interference by the first gateway antenna 131-A. Signals received at the third gateway antenna 131-C from the second satellite 110-B and the first satellite 110-A may be considered interference by the third gateway antenna 131-C.

Despite each subscriber terminal being pointed at a primary satellite, off axis signals may be transmitted to a neighboring, secondary satellite. For example, from the point of view of the first subscriber terminal 120-A the first satellite 110-A is the primary satellite. The first subscriber terminal 120-A may be pointed toward the first satellite 110-A. Moreover, the first subscriber terminal 110-A may lease or purchase access to communication with the first satellite 110-A or be provided access to the first satellite 110-A. The second satellite 110-B and the third satellite 120-C may be considered secondary satellites to the first subscriber terminal 110-A. The first gateway antenna 131-A may be pointed toward the first satellite 110-A and may consider the first satellite 110-A the primary satellite and the second and third satellites 110-B, 110-C secondary satellites.

One embodiment of the invention provides for a gateway that includes at least a first and second antenna. The first antenna receives a first signal from a first satellite. The first signal may be a primary signal received from a first user. The second antenna may receive a second signal from a second satellite. This second signal may include a primary signal from a second user and a version of the first signal from the first user. The gateway may remove the second primary signal from the second signal leaving the first signal using any of various interference canceling techniques known in the art. The first signal received from the first satellite and the version of the first signal received from the second satellite may then be combined. This combination may improve the performance of the signal received from the first user. The gateway and/or the first user may not be provided access to the second satellite.

Another embodiment of the invention may include a gateway with a third antenna. The third antenna may receive a third signal from a third satellite. This third signal may include a primary signal from a third user and a version of the first signal. The gateway may remove the third primary signal from the third signal leaving the first signal using any of various interference canceling techniques known in the art. The first signal received from each of the first satellite, the second satellite and the third satellite may be combined.

Another embodiment of the invention provides for a gateway that includes at least a first and second antenna. The first antenna receives a first signal from a first satellite and the second antenna receives a second signal from a second satellite. The first signal may include a first signal from a first user and a third signal from a third user. The second signal may include a second signal from a second user and the third signal. The third signal from the third user may be isolated from both the first and second signals at the gateway using any of various interference canceling techniques known in the art and combined providing a combined third signal. The gateway and/or subscriber terminals may not have primary access to the first and/or second satellites.

Figure 2:
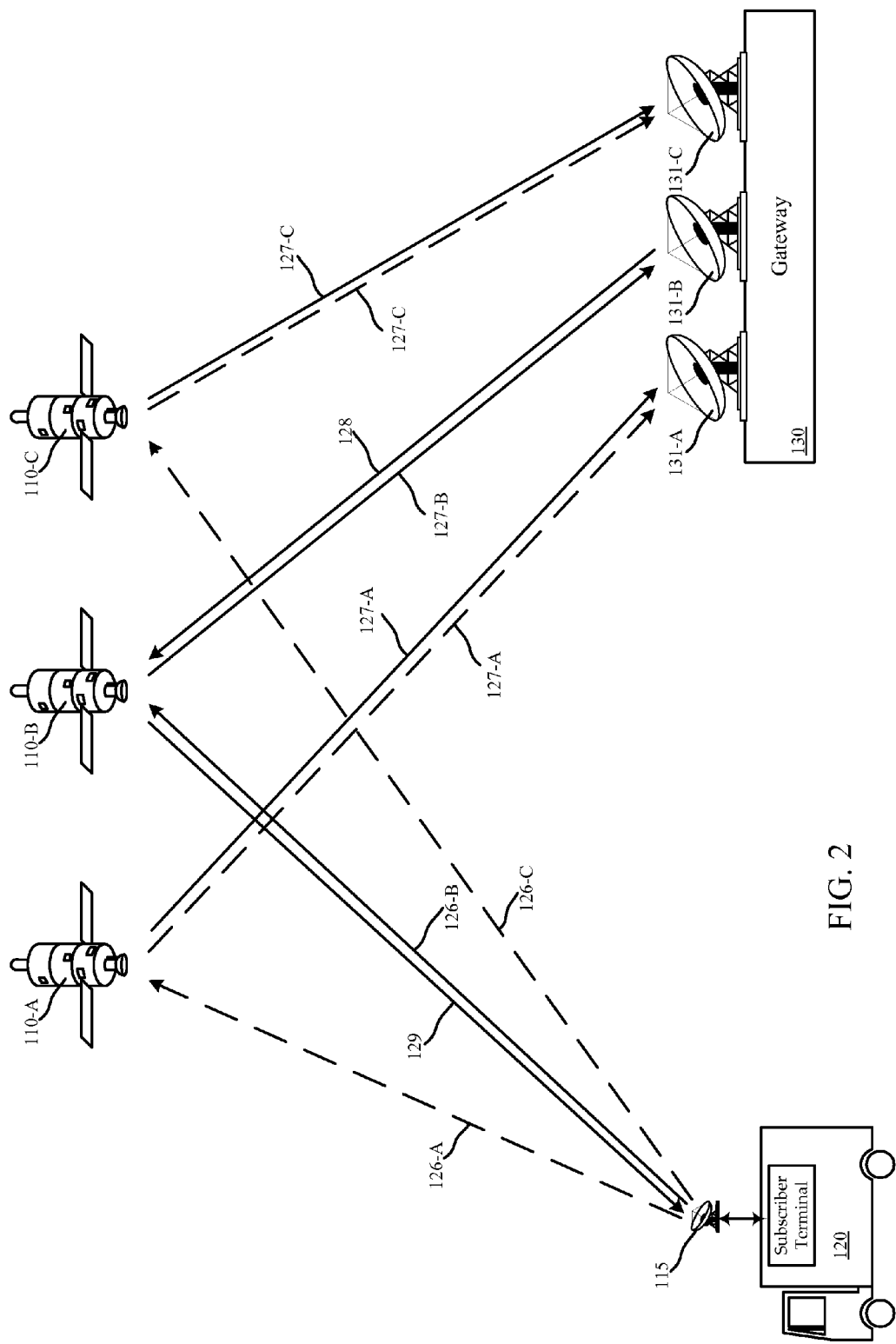
FIG. 2 shows a satellite communication system according to one embodiment of the invention.

FIG. 2 shows a satellite communication system according to one embodiment of the invention. A subscriber terminal 120 includes an antenna 115. In this embodiment, the subscriber terminal is a mobile subscriber terminal mounted on a truck. In other embodiments the subscriber terminal may stationary, spaceborne, seaborne, or airborne. While not shown in FIG. 2, more than one subscriber terminal may be used. The subscriber terminal 120 communicates with a gateway 130 using a gateway antenna 131-B through a primary satellite 110-B over return service link 126-B and return feeder link 127-B. The gateway 130 communicates with the subscriber terminal over forward feeder links 128 and forward service links 129.

The gateway 130 may be connected to a network (not shown). The network may be any type of network and can include, for example, the Internet, an IP network, an intranet, a wide-area network ("WAN"), a local-area network ("LAN"), a virtual private network, the Public Switched Telephone Network ("PSTN"), a cluster of computers, and/or any other type of network supporting data communication between devices described herein, in different embodiments. A network may include both wired and wireless connections, including optical links. Many other examples are possible and apparent to those skilled in the art in light of this disclosure. As illustrated in a number of embodiments, the network may connect the gateway 130 with other gateways (not pictured), which are also in communication with satellites 110.

The subscriber terminal antenna 115 may have a small aperture due to a number of reasons such as portability, ease of deployment, etc. Thus, the antenna may also have a relatively large beam width. For example, the beam width may be 4°, 5°, 6°, 7°, 8°, 9°, 10°, 11° or 12° and fractions thereof. In other embodiments, the beam width may be larger than 12°.

For purposes of presenting this embodiment, the second satellite 110-B is the primary satellite, the other two satellites are secondary satellites 110-A, 110-C. The satellites 110 may be positioned within adjacent orbital slots. Accordingly, the satellites may be separated by at least 2°. In another embodiment, the satellites 110 may be in non-adjacent orbital slots. In yet another embodiment two or more of the satellites 110 may also be within the same orbital slot. More than one secondary satellites may also be used. For example, 1, 2, 3, 4, 5, 6, 7, 8, 9 or 10 secondary satellites may be used and may be located in the same, adjacent and/or nonadjacent orbital slots.

The subscriber terminal antenna 115 may be pointed toward the primary satellite 110-B. Similarly, the middle gateway antenna 131-B may also be pointed toward the primary satellite 110-B. The operators of the gateway 130 may lease access to the primary satellite 110-B. This primary access may provide a satellite transmission relay between the gateway 130 and the subscriber terminal 120. The gateway 130 may not lease access to the secondary satellites 110-A, 110-C shown in the figure. The gateway may, however, know the operating parameters of the secondary satellites 110-A, 110-C. For example, the gateway or gateway operators may know the access and code structure used in communication using satellites 110-A, 110-C. Moreover, the gateway may know the communication parameters used to modulate and/or encode the signals sent over the secondary satellites 110-A, 110-C. In one embodiment of the invention, the gateway or gateway operators may not know how to decrypt the data encoded and transmitted through the secondary satellites 110-A, 110-C. In one embodiment, a commercial encoder/decoder may be used to decode signals from the secondary satellites 110-A, 110-C.

The subscriber terminal 120 broadcasts a return link signal 126 to all three satellites 110. While the subscriber terminal antenna 115 is pointed toward satellite 110-B and primarily transmits a signal 126-B toward the primary satellite 110-B, off axis signals from the antenna 115 may be broadcast to the secondary satellites 110-A, 110-C. Secondary satellites 110-A, 110-C receive and transmit signals unrelated to the signals 126-A, 126-B received from the subscriber terminal 120. For instance, various other users have leased or purchased access to secondary satellites 110-A, 110-C. The operator(s) of the subscriber terminal 120 and the operators of the gateway 130 have not leased access to the secondary satellites 110-A, 110-C for the purposes of communication between the gateway 130 and the subscriber terminal 120. Despite not leasing or purchasing access to the secondary satellites 110-A, 110-C, off-axis signals 126-A, 126-B from subscriber terminal 120 are received by the secondary satellites 110-A, 110-C and retransmitted to the gateway 130 through antennas 131-A, 131-C.

Primary signals are also received at the secondary satellites 110-A, 110-C and rebroadcast. These signals are received from an intended subscriber terminal (not shown) and may interfere with the secondary signals from the subscriber terminal. The signals from the intended subscriber terminals and the subscriber terminal 120 will be transmitted to the gateway as a composite signal 127-A, 127-C.

Figure 3:
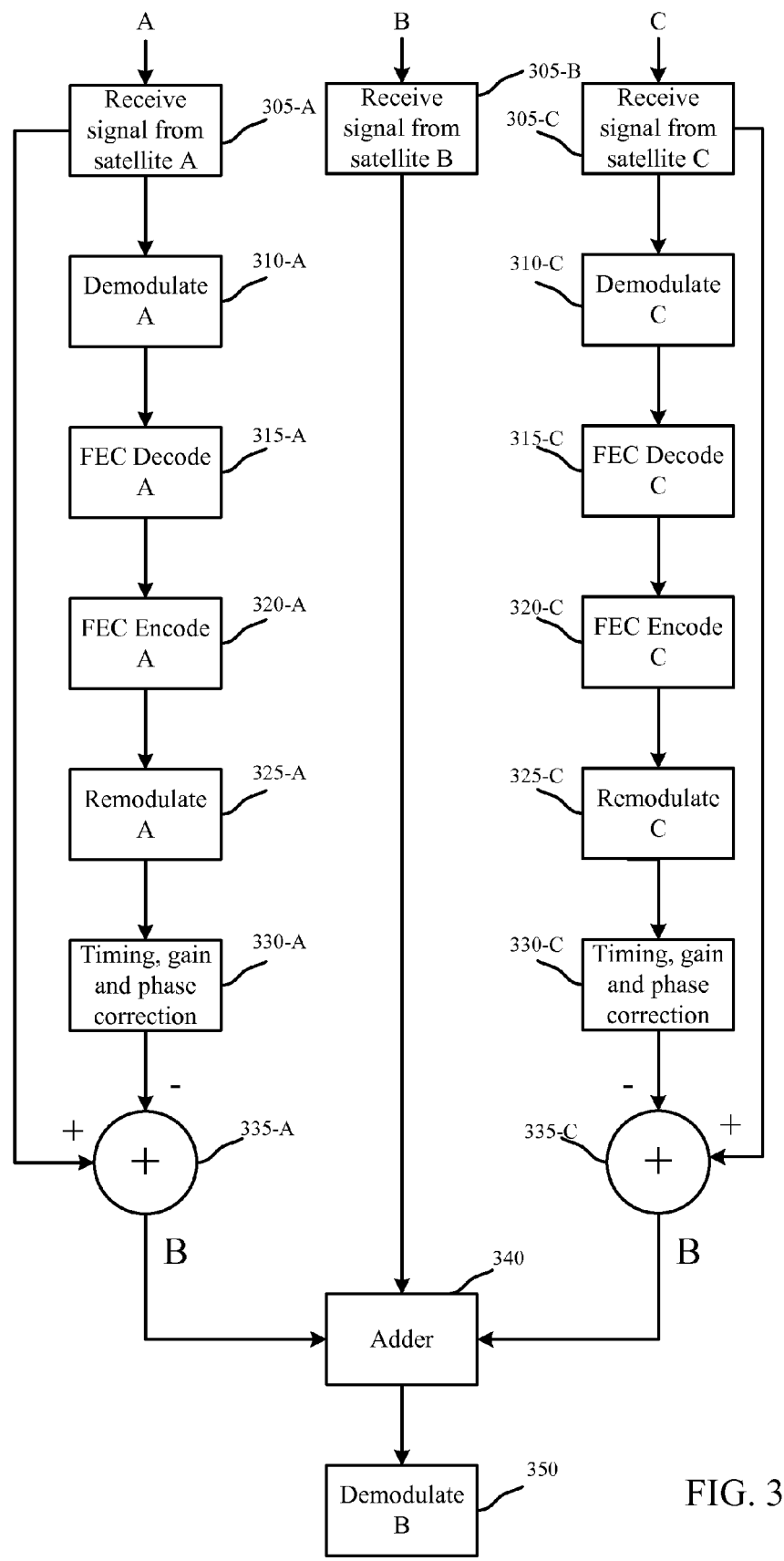
FIG. 3 shows a flowchart showing a method for combining signals received from the subscriber terminal according to one embodiment of the invention.

FIG. 3 shows a flowchart showing a method for combining signals A, B, and C received from the subscriber terminal 120 through the satellites 110 according to one embodiment of the invention. Signals are received from the three satellites at blocks 305. The signals received from the secondary satellites 110-A, 110-C are each independently received and processed to remove the primary signal using interference removal techniques. The signals are individually demodulated at blocks 310. The demodulated signals may be FEC decoded at blocks 315 using any type of commonly used FEC decoder such as, but not limited to, convolutional decoder, block decoder or turbo (iterative) decoder. The symbols may then be FEC encoded at blocks 320 and remodulated where it is reshaped into a replica of the primary component of the received waveform at blocks 325. The remod-demod and decode-encode steps isolate the primary A and C signals from the signals received from the secondary satellites. Those skilled in the art will recognize that there are various other ways to isolate these signals without deviating from spirit of the present invention. For example, various interference removal techniques may be employed.

Once isolated, the timing, phase and/or gain may be corrected at block 330. Isolated signals A and C may then be subtracted from the signals received from the secondary satellites at blocks 335. Specifically, isolated signal A is subtracted from the signal received from the first secondary satellite 110-A. Isolated signal C is subtracted from the signal received from the second secondary satellite 110-C. Moreover, a delay may be adjusted to the signals in order to counteract any path length variations. Once the isolated primary signal has been subtracted the secondary signals remain and may be added with the signal received from the primary satellite 110-B at block 340. Signal B may then be demodulated and decoded at block 350. In another embodiment of the invention delays appropriate to the various versions of the signal of interest may be introduced in order to align the signals prior to the adder.

Figure 4:
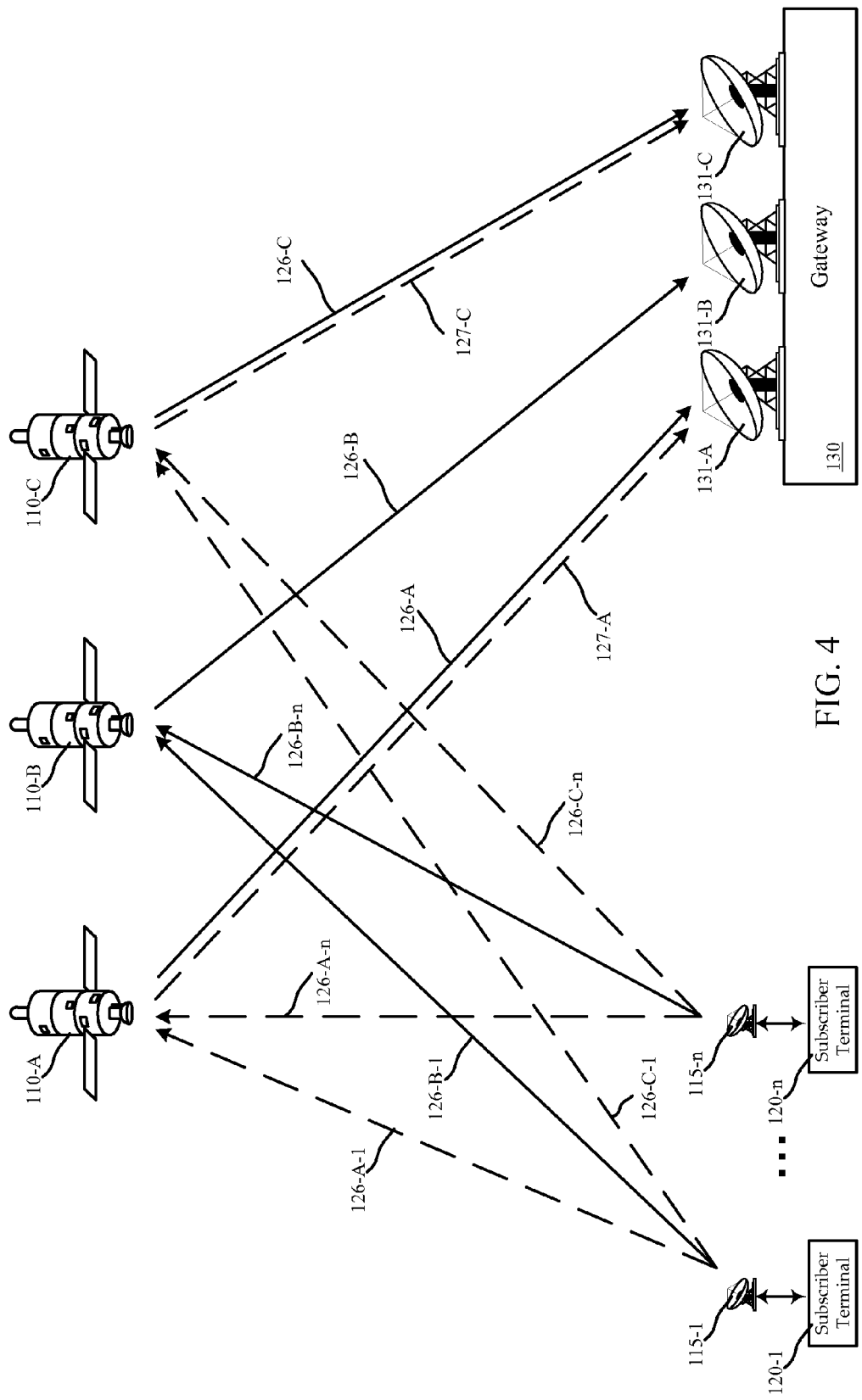
FIG. 4 shows a satellite communication system according to another embodiment of the invention.

FIG. 4 shows a satellite communication system with multiple subscriber terminals according to one embodiment of the invention. According to this embodiment of the invention multiple subscriber terminals 120 communicate with gateway 130 through satellites 110. Each subscriber terminal 120 is similar to the subscriber terminal describe in conjunction with FIG. 2. That is, each subscriber terminal 120 broadcasts a return link signals 126 to all three satellites 110. While the subscriber terminal antennas 115 are pointed toward satellite 110-B and primarily transmit a signal 126-B toward the primary satellite 110-B, off axis signals from the antenna 115 may be broadcast to the secondary satellites 110-A, 110-C. All three signals are then retransmitted from the satellites 110 to the gateway 130. The various signals may be encoded using OFDM, TDMA, SCDMA, or other coding techniques and/or spread spectrum techniques.

Figure 5:
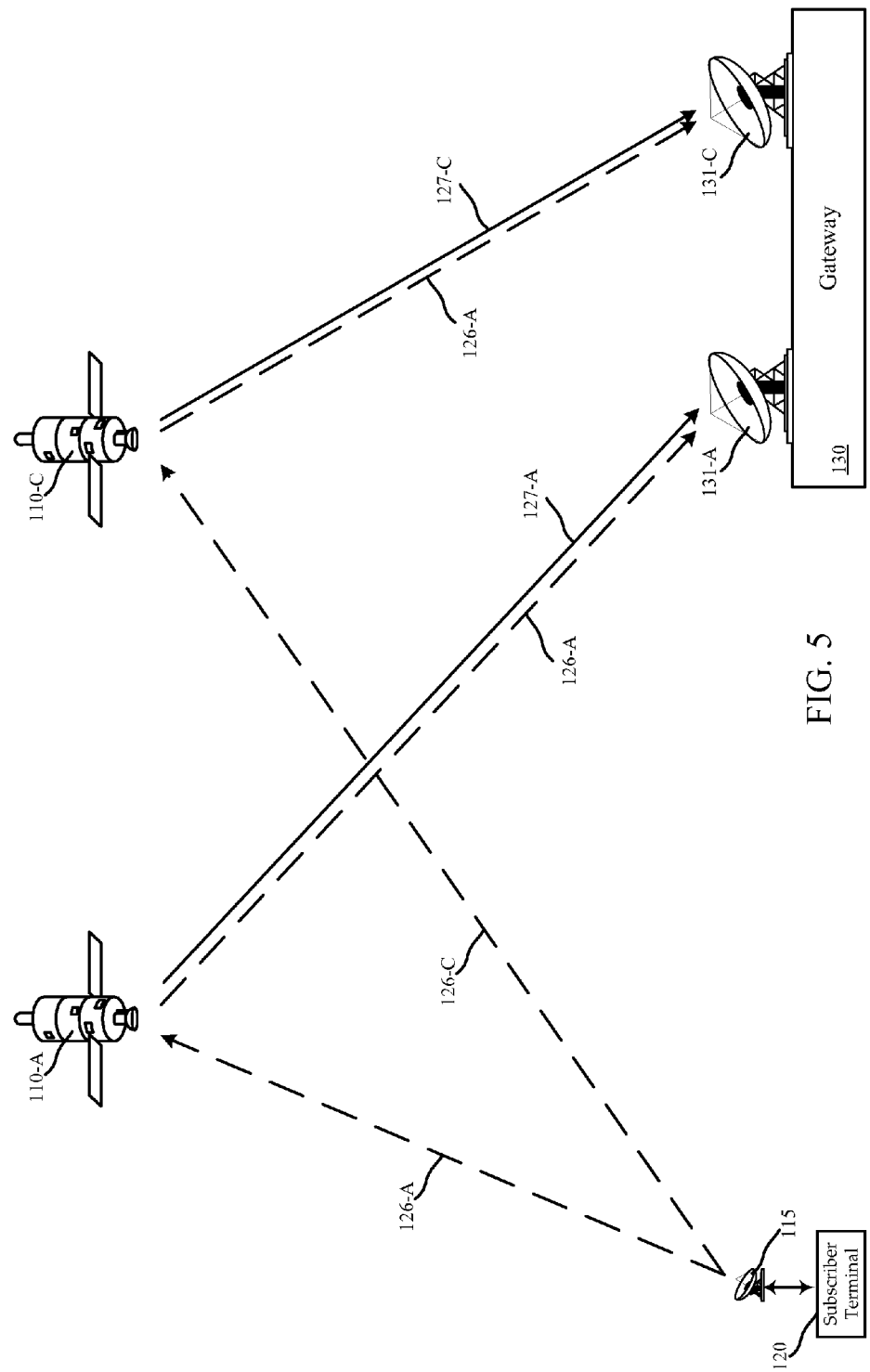
FIG. 5 shows another satellite communication system according to another embodiment of the invention.

FIG. 5 shows another satellite communication system according to another embodiment of the invention. According to this embodiment of the invention, subscriber terminal 120 transmits signals 126 to the gateway 130 through two secondary satellites 110-A, 110-B. According to this embodiment of the invention, the subscriber terminal does not transmit signals to a primary satellite. Both secondary satellites do not provide primary access to the subscriber terminal and/or to the gateway.

Figure 6:
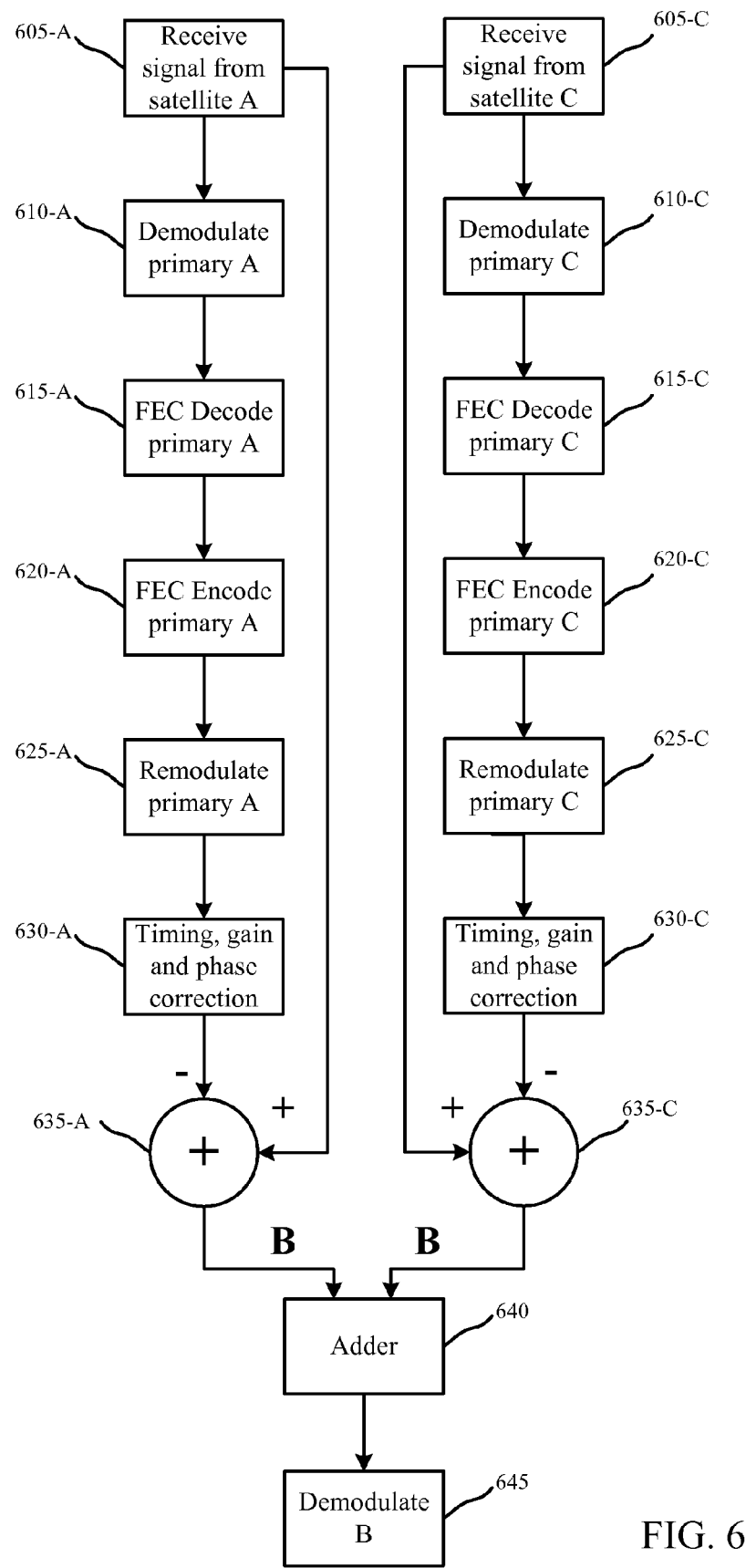
FIG. 6 shows a flow chart for isolating and adding the signals received from secondary satellites according to another embodiment of the invention.

FIG. 6 shows a flow chart for isolating and adding the signals received from the secondary satellites 110-A, 110-C shown in FIG. 5 according to another embodiment of the invention. The signals may be received and processed, for example, at a gateway. Primary signal A is received at the first secondary satellite 110-A and primary signal C is received at the second secondary satellite 110-C. Both secondary satellites also receive signal B as a secondary signal. The goal of the flow chart is to isolate the secondary signals by subtracting out the primary signals and then adding the secondary signals. Signals A and C are received from their respective satellites at blocks 605. The primary signals, signal A and signal C, are then demodulated at blocks 610 and decoded at blocks 615. The primary signals are then recoded at blocks 620 and remodulated at blocks 625. The primary signals are then subtracted from the received signal at blocks 635. Once subtracted, the secondary signals, signal B, is left. According to this embodiment, the two channels produce two signals that may then be added together at block 640 and demodulated at block 645. A delay in one or both channels may be introduced as well. The signals may be added using maximal ratio combining or any other soft combining.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and/or various other mediums capable of storing, containing or carrying instruction(s) and/or data.

While the principles of the disclosure have been described above in connection with specific apparatuses and methods, it is to be clearly understood that this description is made only by way of example and not as limitation on the scope of the disclosure.

What is claimed is:

1. A satellite communication gateway comprising:
   a first antenna configured to receive a signal from a first satellite, wherein the signal received from the first satellite includes at least a first signal from a first user;
   a second antenna configured to receive a second signal from a second satellite, wherein the second signal includes at least a second primary signal from a second user and a second secondary signal;
   a demodulator-remodulator configured to isolate the second secondary signal from the second signal; and
   a combiner configured to synchronize the first signal and the second signal and combine the first signal and the second secondary signal to generate a received signal having a higher apparent signal strength than that of the first signal alone,
   wherein the combiner is a maximal ratio combiner, and
   wherein the second secondary signal includes a version of the first signal.

2. The satellite communication gateway of claim 1, further comprising:
   a third antenna configured to receive a third signal from a third satellite, wherein the signal received from the third satellite includes at least a third primary signal from a third user and a third secondary signal;
   a second demodulator-remodulator configured to isolate the third secondary signal from the third signal;
   wherein the combiner is configured to combine the first signal, the second secondary signal and the third secondary signal to generate the received signal,
   wherein the third secondary signal includes a version of the first signal.

3. The satellite communication gateway of claim 2, wherein the first user does not lease access to the third satellite.

4. The satellite communication gateway of claim 1, wherein the first user leases access to the first satellite.

5. The satellite communication gateway of claim 1, wherein the first user does not lease access to the second satellite.

6. A satellite communication method comprising:
   receiving a signal from a first satellite, wherein the signal from the first satellite includes at least a first signal from a first user;
   receiving a signal from a second satellite, wherein the signal from the second satellite includes at least a second primary signal from a second user and a second secondary signal;
   canceling the second primary signal from the second signal to generate a modified second signal; and
   synchronizing the first signal and second signal and combining the modified second signal and the first signal to generate a received signal having a higher apparent signal strength than that of the first signal alone,
   wherein the combining includes maximal ratio combining, and
   wherein the second secondary signal includes a version of the first signal.

7. The method according to claim 6, further comprising delaying either the first or the second signal prior to the combining.

8. The method according to claim 6, wherein the canceling includes demodulating the second signal using noise canceling techniques.

9. The method according to claim 6, wherein the first user leases access to the first satellite.

10. The method according to claim 6, wherein the first user does not lease access to the second satellite.

11. The method according to claim 6, further comprising:
    receiving a third signal from a third satellite, wherein the third signal from the third satellite includes at least a third primary signal from a third user and a third secondary signal;
    canceling the third primary signal from the third signal to generate a modified third signal; and
    combining the modified third signal, the modified second signal, and the first signal to generate the received signal,
    wherein the third secondary signal includes a version of the first signal.

12. The method according to claim 11, wherein the first user does not lease access to the third satellite.

13. A satellite communication method comprising:
    receiving a first signal from a first satellite, wherein the first signal includes at least a first primary signal from a first user and a second signal from a second user;
    receiving a third signal from a second satellite, wherein the third signal includes at least a third primary signal from a third user and a version of the second signal;
    isolating the second signal from the first signal;
    isolating the version of the second signal from the third signal; and
    synchronizing the first signal and second signal and the second signal isolated from the first signal and the second signal isolated from the third signal to generate a received signal having a higher apparent signal strength than that of the second signal alone, wherein the combining includes maximal ratio combining.

14. The satellite communication method according to claim 13, wherein the second user does not lease access to the first satellite and the second user does not lease access to the third satellite.

* * * * *